United States Patent [19]
> Baker et al.

[11] 3,943,006

[45] Mar. 9, 1976

[54] METHOD OF MAKING A FUEL CELL ELECTRODE

[75] Inventors: Bernard Baker, Brookfield Center; Martin Klein, Brookfield, both of Conn.

[73] Assignee: Energy Research Corporation, Danbury, Conn.

[22] Filed: Oct. 1, 1974

[21] Appl. No.: 510,996

Related U.S. Application Data

[63] Continuation of Ser. No. 428,826, Dec. 27, 1973, abandoned, which is a continuation of Ser. No. 200,222, Nov. 18, 1971, abandoned.

[52] U.S. Cl............................ 136/120 FC; 264/49
[51] Int. Cl.$^2$.......................................... H01M 4/06
[58] Field of Search ....... 136/120 FC, 86 D; 264/49

[56] References Cited
UNITED STATES PATENTS

| | | | |
|---|---|---|---|
| 3,248,267 | 4/1966 | Longer et al. | 136/86 D |
| 3,281,511 | 10/1966 | Goldsmith | 264/49 |
| 3,306,779 | 2/1967 | Flannery et al. | 136/86 D X |
| 3,346,421 | 10/1967 | Thompson et al. | 136/86 D X |
| 3,351,495 | 11/1967 | Larsen et al. | 264/49 |
| 3,481,789 | 12/1969 | Winsel | 136/86 D |
| 3,527,616 | 9/1970 | Losdi | 136/86 D |
| 3,549,423 | 12/1970 | Grubb et al. | 136/120 FC |
| 3,595,700 | 7/1971 | Rosansky | 136/120 FC |

*Primary Examiner*—John H. Mack
*Assistant Examiner*—C. F. LeFevour
*Attorney, Agent, or Firm*—Watson Leavenworth Kelton & Taggart

[57] ABSTRACT

Electrode structures for fuel cells are made by blending noble metal black, dry polytetrafluoroethylene and a soluble bulking agent in a liquid, filtering liquid from the blend and rolling the remnant to form a sheet of fibrillated polytetrafluoroethylene containing noble metal black and bulking agent. The bulking agent may be leached from the sheet and the sheet then pressed or the sheet may be first pressed and the bulking agent then leached from the sheet.

11 Claims, No Drawings

METHOD OF MAKING A FUEL CELL ELECTRODE

This is a continuation of application Ser. No. 428,826, filed Dec. 27, 1973, now abandoned, in turn a continuation of original application Ser. No. 200,222, filed Nov. 18, 1971, now abandoned.

This invention relates to electrochemical (fuel) cell electrodes, and specifically to those composed of a thin layer of noble metal supported by a web of polytetrafluoroethylene (PTFE), as well as a method of producing such electrodes. More particularly the invention relates to a method of producing such electrodes by mixing particles of a noble metal, PTFE and a bulking agent in an inert liquid, separating the solids and milling them into a sheet, leaching the bulking agent from the sheet, thus forming a thin layer of noble metal in a web of PTFE.

A fuel cell is a device which converts the chemical energy of a fuel directly into electricity by means of a galvanic combustion process. The basic fuel cell elements are electrodes where the fuel is oxidized (anode, negative) and the oxidant is reduced (cathode, positive); electrolyte which conducts ions between electrodes; chambers for fuel and oxidant; and plates for containing reactants, separating gas and carrying current. The electrodes are extremely critical because it is at this point that the electricity is actually made by means of the complex electrochemical reaction. It has been found that only a few materials can usefully be regarded as electrodes in most conventional low-temperature fuel cells.

In alkaline electrolyte fuel cells, nickel and/or precious metals are typically used as anode materials and silver or precious metals as cathodes. In acid electrolyte fuel cells only precious metals such as platinum and platinum mixtures such as platinum-ruthenium and platinum-rhodium and precious metals plus certain metal oxides have been found active. Since platinum and related precious metals are expensive, there is incentive to reduce the amounts of precious metal present in the electrode without suffering excessive losses in performance. We have been able to construct electrodes in which very little precious metal is required to obtain good electrochemical activity for the reduction of oxygen in air.

It is desirable for the electrodes to be capable of withstanding severe operating environments as are prevalent in strong alkaline and strong acid fuel cells. For this reason, polytetrafluoroethylene (PTFE) is used as an inert bonding agent and water-proofing agent in the basic platinum electrode structure. The great difficulty which arises in making low loading electrodes is that at platinum levels, for example, in the vicinity of ¼ to 2 and 3 grams per square foot the total thickness of the electrode is very small. Most electrodes of precious metal will operate with PTFE in the range of 5 to 35 weight percent. This amount of PTFE alone is not sufficient to add any substantial bulk to the electrode itself. As a result, an electrode structure consisting of typically 1 gram per square foot platinum plus 20 weight percent PTFE is an extremely flimsy, almost impossible to handle, structure. It is very difficult to make it homogeneous and is very difficult to work with it in any way.

We have circumvented this difficulty by adding to the basic electrode structure an agent or chemical which can at a later point in time be removed from the electrode but which serves several functions. First, it allows the electrode to be made with sufficient bulk to insure a degree of handability otherwise not available. Second, it allows the electrodes to be made with a very uniform distribution of active material, usually platinum, over the surface of the electrode. Thus, our electrode exists in two states: a preliminary state in which the electrode is made up of the three components, that is, metal (e.g. platinum), PTFE and the removable bulking agent, and a second (final) state wherein the electrode comprises only metal and PTFE.

In making the first state electrode, it is, of course, essential that the bulking agent be something that is readily removable without damaging the basic structure of the electrode and something that can be well mixed with platinum during a fabrication of the first state electrode. We have found that several chemicals available in fine powder form can be made to perform the function of the bulking agent. These chemicals can either be organic in nature, such as powdered sugar, or they can be inorganic in nature, as for example zinc oxide. In the case of the powdered sugar, the second (final) electrode state can be obtained simply by dissolving the sugar and removing it from the electrode structure by applying warm water to the electrode structure. In the case of zinc oxide, the zinc oxide may be removed by dissolving it in sulfuric or hydrochloric acid. We have not found that either the organics or the inorganics have clear-cut advantage in the manufacture of the electrode itself.

The general process for making a platinum electrode involves mixing a predetermined amount of PTFE powder, platinum black, and the bulking agent, for example micromilled sugar, in a blender with an excess of organic liquid such as mineral spirits. The PTFE powder constitutes at least 10 percent of the combined weight of the noble metal black and the PTFE. The blended mixture is then filtered either on a conventional Buchner type filter or a centrifugal filter and the residue collected. The residue, a homogeneous mixture of PTFE, platinum black and sugar, is then removed from the filter and transferred to rolling mill. In the rolling operation the mixture is successively rolled between rollers or between a roller and a flat plate in such a fashion that the PTFE particles are essentially stretched into a fibrous web and the mixture begins to exhibit the property of cohesion. Continuous rolling ultimately results in material with a rubber-like consistency. The materials can be rolled to any desired thickness. In general, the platinum loading on the per square foot basis is achieved by rolling the material to a desired area, as illustrated in the examples that follow. Once the material has been rolled, it is then air-dried at near ambient temperatures to remove the remaining organic liquid. Once the organic liquid has evaporated, the sheet material is dried at slightly elevated temperature such as 60° C. to remove the remaining traces of organic liquid. The operation must be done with care because there is a possibility that the liquid may ignite on the active platinum black surface.

The dried material is now ready for assembly into the fuel cell in a variety of different ways. For example, the sheet of material can now be pressed onto a metal screen or grid and the grid plus electrode assembly can be then washed with warm water, with the electrode assembly acting as a filter medium with net result that the sugar is dissolved from the electrode leaving behind a very homogeneous platinum and PTFE film. This film is extremely thin and would be very difficult to handle without the presence of screening. A second alternative is to deposit the dry mixture of sugar, PTFE and platinum mix on a graphite-PTFE substrate, as disclosed in our application entitled "Electrode Substrate," Ser. No. 200,052, now abandoned. This substrate plays a role similar to that played by the metallic screen grid. It acts as a support for the electrode as well as electronic current collector. This part again is washed in warm water and the result is a uniform platinum film deposited onto the porous graphite-PTFE substrate.

The next step is that the metallic grid with the film of platinum and PTFE or the porous graphite-PTFE substrate material with the film of platinum and PTFE thereon is subjected to a final pressing to insure good bonding between the support and the metallic electrode. In the last step the electrode assembly with a screen on a graphite substrate is subjected to a sintering operation at approximately 325° C. to allow the PTFE in the electrode to set, thereby imparting a high degree of hydrophobicity to the electrode. We have made electrodes over a wide range of platinum loading by this process. While others have made relatively high catalyst loading fuel cell electrodes 5–50 gms./sq. ft. by other methods, our method permits us to make electrodes with as little as 0.25 gms./sq. ft. For loadings less than 1 gm. per sq. ft. the graphite substrate described in the copending application must be used since we have found that at this level of loading there is not sufficient material to stretch between the typical screen grids without major imperfections arising. Specific examples of preparation of these electrode materials are given below.

EXAMPLE I

Ten grams of sugar that have been micromilled to a fine powder are mixed with three grams of platinum black and 1 gram of powdered PTFE in 200 cc. of mineral spirits. The mixture is blended in a rotary blender, for approximately five minutes and the homogeneous solution is then filtered on either a centrifugal or Buchner type of filter.

The filter cake is collected and rolled between either two rollers or a roller and a flat plate. This milling-/calendering operation is continued until the sugar-platinum-PTFE mix reaches a consistency capable of supporting its own weight.

The final rolling of the material is to a fixed area. In this example, a final area of 1 square foot is achieved, resulting in a final electrode catalyst loading of 3 grams per square foot. The rolled electrode is allowed to dry, so that the mineral spirits evaporate, leaving the homogeneous sheet of platinum-PTFE and powdered sugar.

The electrode is then washed with hot water, approximately 160° F. to remove the sugar. Washing itself is achieved by placing the platinum sugar PTFE composites on a porous support-like filter paper. The water is sucked through the electrode and support by a vacuum aspiration system.

The platinum electrode is now placed between two pieces of cellophane and pressed to a final pressure of 2500 pounds per square inch. It is removed from the press and the cellophane is removed from the electrode surfaces and the electrode is placed on the graphite substrate described in our above-referenced application entitled "Electrode Substrate". The electrode-graphite support is now pressed at a moderate pressure, about 400 psi, to insure good adhesion between electrode and graphite support. Finally the composite is placed on a sintering furnace and is sintered at 325° C. for approximately 15 minutes. The electrode is removed from the oven and cooled to room temperature, and it is then evaluated for use in the fuel cell. Operation of this electrode is described in Table I.

EXAMPLE II

In this instance an electrode was prepared exactly as in Example I, except that 2 grams of platinum black and 0.67 gram of powdered PTFE were mixed with 10 grams of powdered sugar and rolled into a sheet 1 square foot in total area. This resulted in the platinum loading of 2 grams per square foot in the final electrode. The results of this electrode and fuel cell are reported in Table I.

EXAMPLE III

In Example III, exactly the same procedure as in Example I was followed, except that 1 gram of platinum was mixed with 0.33 gram of powdered PTFE and 11 grams of powdered sugar. The final mixing rolled to an area of 1 square foot using the final electrode catalyst floating of 1 gram per square foot. Results are presented in Table I.

EXAMPLE IV

In this example, 0.25 gram of platinum black were mixed with 0.08 gram of powdered PTFE and 12 grams of powdered sugar. The electrode was rolled to a total area of 1 square foot, resulting in a final platinum loading in the test electrode of 0.25 gram per square foot. Results of this electrode are described in Table I.

EXAMPLE V

In this example, the powdered sugar of Example I was replaced in equal weight of powdered micromilled zinc-oxide The same procedure was followed as in Example I, except that in the washing test dilute sulfuric acid was used in place of the water. This electrode showed a loading of 3 grams per square foot and exhibited essentially the same results as the 3 gms./sq. ft. electrode presented in Table I.

TABLE I

| Air electrode performance relative to a Hydrogen Reference | | | | |
|---|---|---|---|---|
| Current Density (Amp/Sq.ft.) | Cell Potential in Millivolts Platinum Black Loading (gm/sq. ft.) | | | |
|  | 0.25 | 1 | 2 | 3 |
| 0 | 900 | 950 | 1000 | 1020 |
| 40 | 650 | 680 | 720 | 740 |
| 80 | 580 | 640 | 670 | 700 |
| 100 | 550 | 620 | 645 | 670 |
| 150 | 460 | 570 | 595 | 650 |
| 200 | — | — | 520 | 610 |

We claim:
1. A method for use in producing electrode structure for fuel cells comprising the steps of:
 a. blending particles of noble metal black, particles of dry polytetrafluoroethylene and particles of a soluble bulking agent in a liquid in which said bulking agent is insoluble, said polytetrafluoroethylene constituting at least 10 percent of the combined weight of said noble metal black and said polytetrafluoroethylene;

b. filtering liquid from said blend to form a filtered mixture;

c. subjecting said filtered mixture to rolling forces to form a sheet of fibrillated polytetrafluoroethylene containing noble metal black and bulking agent; and d. removing the remainder of said liquid from said sheet.

2. The method claimed in claim 1 including the further steps of:

e. applying to said sheet a solvent in which said bulking agent is soluble, thereby leaching said bulking agent from said sheet thereby providing a sheet of fibrillated polytetrafluoroethylene containing noble metal black; and then f. subjecting opposed sides of said leached sheet to pressing forces.

3. The method claimed in claim 2 including the terminal steps of placing such pressed sheet on a substrate, then further pressing said sheet and subjecting said sheet to temperature above the sintering temperature of said polytetrafluoroethylene.

4. The method claimed in claim 1 including the further steps of:

e. pressing such rolled sheet onto a substrate; and then f. applying to said sheet a solvent in which said bulking agent is soluble, thereby leaching said bulking agent from said sheet thereby providing on said substrate a sheet of fibrillated polytetrafluoroethylene containing noble metal black.

5. The method claimed in claim 4 including the terminal steps of further pressing said sheet on said substrate and subjecting said sheet to temperature above the sintering temperature of said polytetrafluoroethylene.

6. The method claimed in claim 1 including the further steps of:

e. applying such rolled sheet to a substrate comprised of graphite and polytetrafluoroethylene; and then f. applying to said sheet a solvent in which said bulking agent is soluble, thereby leaching said bulking agent from said sheet thereby providing on said substrate a sheet of fibrillated polytetrafluoroethylene containing noble metal black.

7. The method claimed in claim 6 including the terminal steps of further pressing said sheet on said substrate and subjecting said sheet to temperature above the sintering temperature of said polytetrafluoroethylene.

8. The method claimed in claim 1 wherein said noble metal black is platinum black.

9. The method claimed in claim 8 wherein said liquid is mineral spirits.

10. The method claimed in claim 2 wherein said bulking agent is fine sugar and wherein said solvent is water.

11. The method claimed in claim 2 wherein said bulking agent is zinc oxide and wherein said solvent is sulfuric acid.

* * * * *